United States Patent [19]
Jewell

[11] Patent Number: 4,630,898
[45] Date of Patent: Dec. 23, 1986

[54] ETALON OPTICAL LOGIC GATE APPARATUS AND METHOD

[76] Inventor: Jack L. Jewell, 12 Timberline Dr., Bridgewater, N.J. 08807

[21] Appl. No.: 542,003

[22] Filed: Oct. 14, 1983

[51] Int. Cl.[4] .......................... G02F 1/03; G02F 1/17; G02F 3/00
[52] U.S. Cl. .................................. 350/354; 350/385; 350/393
[58] Field of Search ................ 350/354, 388, 385–386, 350/393; 364/713

[56] References Cited

U.S. PATENT DOCUMENTS

| | | | |
|---|---|---|---|
| 3,521,070 | 7/1970 | Duguay et al. ..................... | 350/354 |
| 3,610,731 | 10/1971 | Seidel .................................. | 350/354 |
| 3,671,747 | 6/1972 | Duguay .............................. | 350/393 |
| 3,745,476 | 7/1973 | Mack .................................. | 350/354 |
| 3,790,252 | 2/1974 | Pao ..................................... | 350/354 |
| 3,984,785 | 10/1976 | Riseberg et al. .................... | 350/385 |
| 4,418,394 | 11/1983 | Tai ..................................... | 364/713 |

OTHER PUBLICATIONS

Marburger et al., "Theory of a Lossless Nonlinear Fabry-Perot Interferometer", Phys. Review A, 1-1979, pp. 335-342.
Gibbs et al., "Optical Modulation by Optical Tuning of a Cavity", App. Phys. Lett., 4-1979, pp. 511-514.
Felber et al., "Theory of Nonresonant Multistable Optical Devices", App. Phys. Letts., 6-1976, pp. 731-733.
Abraham et al., "The Optical Computer", Scientific American, 2-1983, pp. 85-93.
Smith et al., "Bistable Optical Devices Promise Subpicosecond Switching", IEEE Spectrum, 6-1981, pp. 26-31.
Orlov et al., "Possibility of Construction of an Arithmetic Unit Based on Controlled Optical Transparencies", Sov. Jr. of Quant., Electron., 7-1974, pp. 12-16.
Gunn, J. B., "Light Modulator & Optical Logical Devices", IBM Tech. Disc. Bull., 5-1965, pp. 1202-1205.

*Primary Examiner*—William H. Punter
*Attorney, Agent, or Firm*—Cahill, Sutton & Thomas

[57] ABSTRACT

An optical logic apparatus includes a plurality of logic elements on a single passive, nonlinear Fabry-Perot etalon characterized by a shift in transmissivity in response to increased incident light, a source producing a probe beam having a first wavelength which does not significantly modify the index or refraction of the nonlinear medium, and a plurality of sources of input beams each representing a respective logic signal. The input beams all have a wavelength which significantly modifier the index of refraction of the nonlinear medium. The probe beams illuminate the surface of the etalon. The input beams are mapped by a lens onto the etalon, which produces a plurality of output beams each representing various logical functions of the input beams, which logical functions are determined by the frequency of the various probe beams. The output beams become input beams which are optically mapped, in combination with additional probe beams, onto a second etalon. The outputs of the second etalon can be similarly mapped onto further etalons or into the first etalon.

12 Claims, 8 Drawing Figures

ETALON OPTICAL LOGIC GATE APPARATUS AND METHOD

BACKGROUND OF THE INVENTION

The invention relates to nonlinear Fabry-Perot etalons, and more specifially to use of etalons as logic elements.

Use of nonlinear Fabry-Perot cavities or etalons is known. Typically, an etalon is biased by means of a bias beam having a wavelength which is nearly an integral multiple of the optical thickness of the etalon. However, prior optical switches absorb a lot of light energy, due to the fact that the bias beam is partially absorbed to modify the index of refraction to hold the switch in an on state, and also due to the fact that the switch is an on state, and also due to the fact that the switch is held in its on state for an entire cycle. This results in heating of the device, which can cause the switch to work improperly. Much research on optical bi-stable devices has been published, for example, in "Optical Modualtion by Optical Tuning of a Cavity" by H. M. Gibbs et al., *Applied Physics Letters,* Volume 34, No. 8, Apr. 15, 1979, page 511, "Optical Bi-Stable Devices: The Basic Components of All-Optical Systems?" by H. H. Gibbs et al., *Optical Engineering,* Volume 19, No. 4, July/August 1980, page 463, and "Switching of a GaAs Bi-Stable Etalon: External Switching On and Off, Regenerative Pulsations, Transverse Effects, and Lasing", by H. M. Gibbs et al. Other optical logic elements have also been demonstrated as in "Optical Logic Gates Using a Hughes Liquid Crystal Light Valve" by S. A. Collins, Jr., et al., *SPIE,* Volume 232, 1980 International Optical Computing Conference, page 168, and see C. P. Seaton et al., *Applied Physics Letters,* Volume 42, No. 2, Jan. 15, 1983, page 131. See also "Physics of Optical Switching", by R. L. Fork, Physical Review A, Volume 26, No. 4, October 1982, page 2049. However, none of the prior optical logic gates has the capability of driving numerous successive similar logic elements, due to attenuation of light intensity or lack of a convenient means of regeneration of light signal strength.

Therefore, it is a primary object of the invention to provide an improved optical logic element which is simple to operate, capable of reliably performing logical operations using a single Fabry-Perot etalon at substantially higher speed, and with lower power dissipation than any prior high speed optical logic elements.

It is another object of the invention to provide an optical logic element which is capable of producing output beams representing logic combinations of light encoded logic signals with sufficient intensity to drive subsequent optical logic element stages without use of any gain medium.

It is another object of the invention to provide an optical logic element which is capable of producing output beams representing logic combinations of light encoded logic signals with reduced intensity and yet having the capability of driving subsequent optical logic element stages without the use of any gain medium.

It is another object of the invention to provide an optical logical element apparatus and method for simultaneous multiple optical logic operations in successive stages at very low power dissipation and high data rates.

It is another object of the invention to provide an optical logic element producing high speed, low power inverting logic functions with high contrast output beams.

SUMMARY OF THE INVENTION

Briefly described and in accordance with one embodiment thereof, the invention provides an optical logic apparatus including an etalon having a nonlinear medium which is characterized by a change in its index of refraction and/or absorption coefficient in response to an increase in incident light, a source for producing a probe beam having a wavelength which does not significantly modify the transmissivity of the etalon, sources for producing a plurality of input beams each representing a respective data signal and each having a wavelength which does significantly modify the transmissivity of the etalon means for guiding the probe beam and input beams into the etalon so that the etalon undergoes an increase or decrease in transmissivity in response to presence or absence of light in the various input beams to produce a predetermined logic operation on the input data signals. In the described embodiment of the invention, the probe beam and the input beams are pulses which are short in duration compared to the relaxation time constant of the nonlinear medium. The probe pulses occur immediately after the input pulses occur. In the described embodiment of the invention, the intensity (or energy) of each of the input beams results in an FWHM (full width at half maximum) shift in the transmissivity of the etalon from its transmissivity level with only the corresponding probe beam incident, i.e., if that input beam is at a logical "1" level. For a first probe beam having a wavelength equal to the initial resonant wavelength of the etalon, the transmissivity characteristic of the etalon causes a logical NOR operation to be formed on the input data signals. For a second probe beam having a wavelength which is initially "detuned" one half of an FWHM, the transmissivity characteristic of the etalon produces a logical NAND operation on the input data signals. If another probe beam having a wavelength detuned in an amount equal to a full FWHM, the transmissivity characteristic of the etalon produces an exclusive OR function in the input data signals. If the probe beam wavelength is detuned by one and one-half FWHM, a logical OR function is performed on the input beams. If the probe beam wavelength is detuned by two FWHMs, a logical AND function is performed on the input beams. In the described embodiment of the invention, the output beams produced by the optical logic operations performed by the first etalon become input beams which, in conjunction with additional input and/or probe beams, are mapped into a second similar optical logic element, the output beams of which are mapped into successive etalons or into the first mentioned etalon, or into an array of photodetector devices which convert the output beams into corresponding electrical logic signals.

In another embodiment of the invention, a continuous wave probe beam of relatively high intensity is directed to an etalon, the continuous wave probe beam having a wavelength equal to the wavelength at the base of the approximately linear portion of the transmissivity peak of the etalon for zero intensity of an input beam. The continuous wave probe beam has a wavelength which does not significantly modify the transmissivity of the etalon. The input beam has a wavelength which does significantly modify the transmissivity of the etalon. The input beam is modulated at a rate that is slow compared to the relaxation time of the non-linear medium of the etalon, approximately linearly modulating the index of refraction of the nonlinear medium and thereby producing a relatively high amplified modulation on the output beam produced by the etalon.

To avoid distortion at high signal strength, the maximum input intensity should be such that at the maximum intensity of the input beam, the probe wavelength is approximately at the shoulder of approximately linear portion of the transmissivity peak of the etalon.

DESCRIPTION OF THE INVENTION

Figure 1:
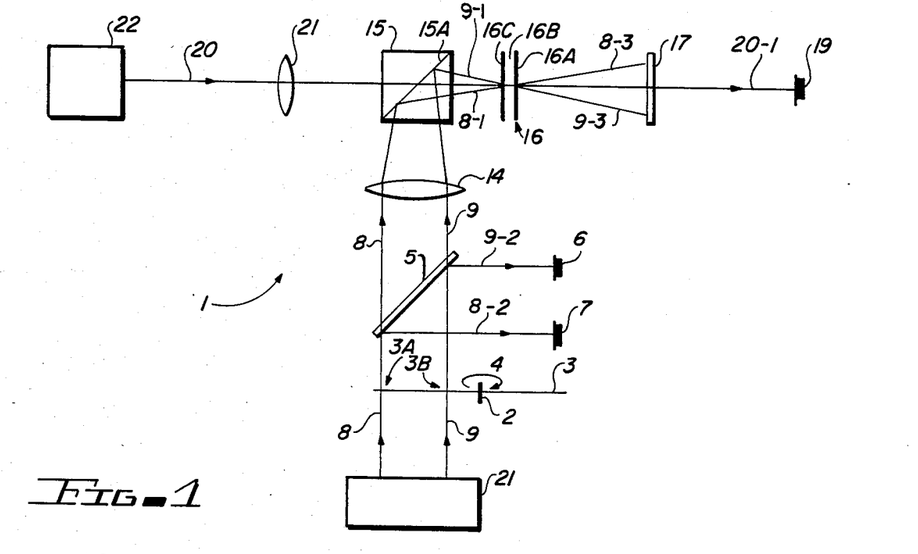
FIG. 1 is a diagram schematically illustrating a single level of optical logic elements in accordance with the present invention.

Referring now to FIG. 1, optical logic apparatus 1 includes a nonlinear Fabry-Perot etalon 16, hereinafter referred to simply as etalon 16. In the experiments that lead up to this invention, dye-filled etalons were used, although gallium arsenide etalons would be much more practical as logic elements because dye-filled etalons have much slower responses. Gallium arsenide etalons are known to those described in the art and some of their properties are reported in "Optical Modulation by Optical Tuning of a Cavity", by H. M. Gibbs et al., *Applied Physics Letter*, Volume 34, No. 8, page 511, Apr. 15, 1979, incorporated herein by reference and in "Optical Bistable Devices: The Basic Components of All-Optical Systems?" by H. M. Gibbs et al., *Optical Engineering*, July/August 1980, Volume 19, No. 4, page 463, also incorporated herein by reference.

Fabry-Perot etalons are well known to those skilled in the art. Furthermore, those skilled in the art of optical bistability know what a nonlinear Fabry-Perot etalon is, wherein a medium that is nonlinear with respect to light is positioned between the two mirror surfaces of the etalon.

Referring to FIG. 1, reference numerals 16A and 16C represent spaced mirror surfaces which are partially transmissive to light, and a nonlinear medium 16B disposed between mirror surfaces 16A and 16C. The absorptivity (i.e., absorption coefficient) and/or index of refraction of the nonlinear medium 16B, in conjunction with the reflectivity of the mirror surfaces 16A and 16C, determine how much of the light incident on a surface of etalon 16 is reflected, absorbed, and/or transmitted.

Further details on properties of dye-filled etalons are reported in "Observation of Thermal Optical Bistability, Crosstalk, Regenerative Pulsations, and External Switch-Off in a Simple Dye-Filled Etalon" by M. C. Rushford et al., which was presented at the Topical Meeting on Optical Bistability held in Rochester, N.Y. on June 17 through June 20, 1983. This paper will be published in a book entitled *Optical Bistability II* to be published by Plenum Corporation. A copy of the foregoing article and is incorporated herein by reference.

In FIG. 1, a polarizing cube 15 is used to combine two input beams 8 and 9 produced by an electrical-to-optical converter device 21. Polarizing cube 15 totally reflects these two beams from inclined surface 15A onto surface 16C of etalon 16. Reference numerals 8-1 and 9-1 designate the reflected portions of beams 8 and 9, respectively.

A beam splitter, such as a sheet of glass, represented by reference numeral 5 transmits nearly all of the light of beams 8 and 9 directly to lens 14. In the experimental set up represented by FIG. 1, lens 14 is positioned as shown merely to focus beams 8 and 9 onto surface 15A of polarizing cube 15. In that experimental set up, beams 8 and 9 were too far apart for them both to impinge on surface 15A without being focused somewhat.

However, small portions of beams 8 and 9 designated by numerals 8-2 and 9-2, respectively, are reflected from beam splitter 5 into two photo-multiplier tubes 6 and 7. The outputs of photo-multiplier tubes 6 and 7 are connected to inputs of an oscilloscope (not shown) to allow monitoring of the two input beams 8 and 9.

Polarizing cubes such as 15 have the characteristic that the surface 15A will totally transmit an incoming beam which is polarized in one direction, for example, horizontally, and totally reflect an incoming beam which is polarized in another direction, for example, vertically. Such polarizing cubes are readily commercially available from such companies as Karl Lambrecht Corporation.

In FIG. 1, reference numeral 20 designates a probe beam which is polarized so as to be transmitted by polarizing cube 15 onto surface 16C of etalon 16. Lens 21 focuses the probe beam 20 onto the left surface of polarizing cube 15. In practice, the two lenses 14 and 21 could be replaced by a single lens disposed between the right side of polarizing cube 15 and etalon 16.

In my experiments using dye-filled etalons, the probe beam source indicated by block 22 in FIG. 1 was a continuous wave laser. In the preferred embodiments of the invention the probe light beam 20 would not be a continuous wave beam, but would be pulsed in synchronization with pulses of the input light beams 8 and 9 in the manner indicated by the upper graph in FIG. 3, wherein reference numeral 124 designates a single pulse of either one of input beams 8 and 9, reference numeral 125 indicates an immediately designates the simultaneous occurrence of pulses of input beams 8 and 9, and reference numeral 127 designates an immediately following pulse of probe beam 20.

Figure 3:
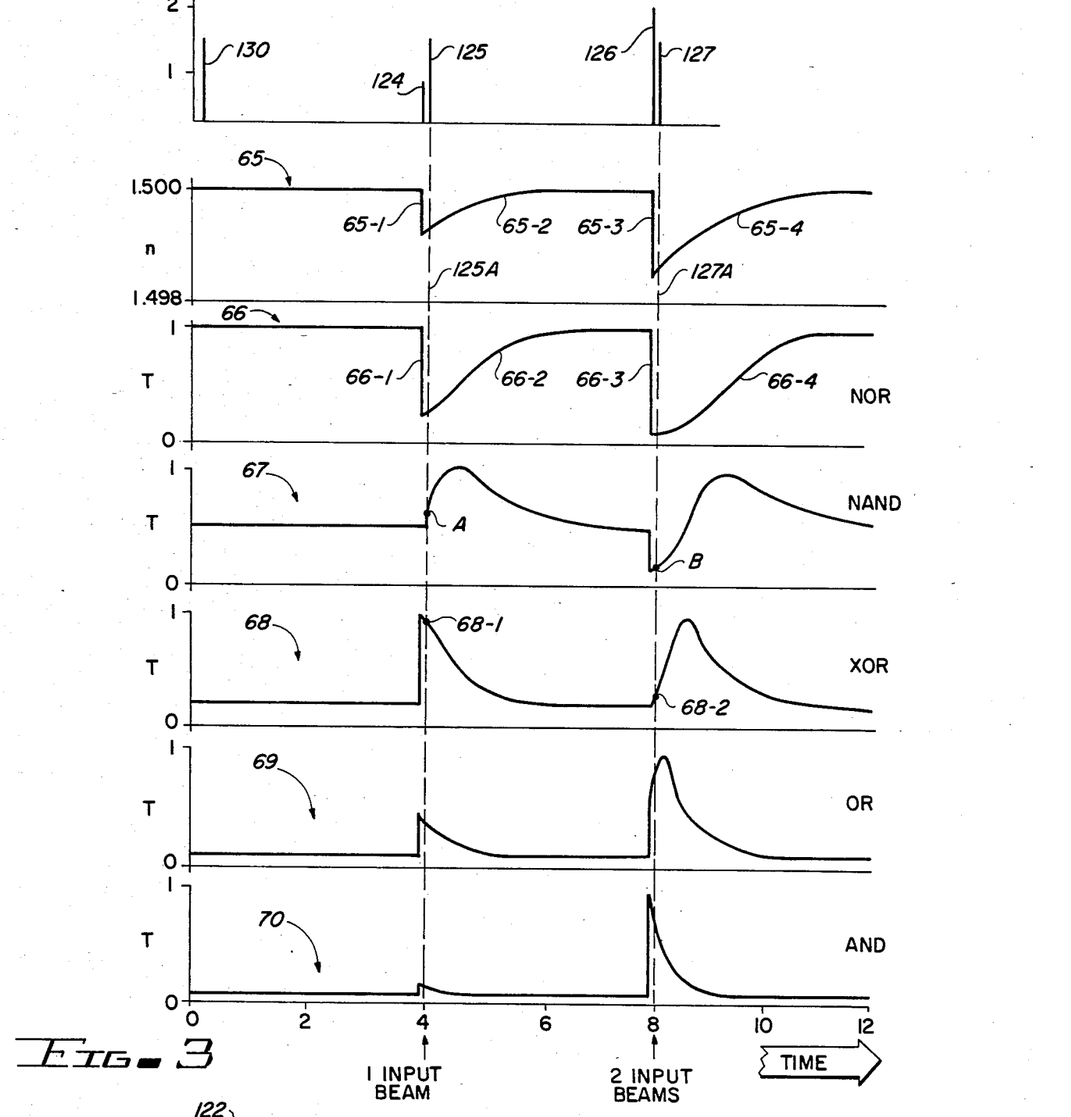
FIG. 3 is a graph illustrating computer simulated results of the Fabry-Perot etalon in FIG. 1 for different probe beams.

Initial probe beam pulse 130, with no input beam pulse present, is shown in FIG. 3, analogous to probe beam pulses 125 and 127, to show the transmissivity of etalon 16 with no input pulses present. The pulses 124 and 126 can be thought of as representing energy, so input beam pulse 126 is twice the height of input beam pulse 124. In practice, the energy or intensity of the probe beam pulses 125 and 127 would be much greater than that of both of the input pulses 124 and 126.

For experimental purposes, it was better to use a continuous wave probe beam in order to show the entire time profile of etalon transmissivity of the probe beam.

For a gallium arsenide etalon, the wavelength of probe beam 20 would probably be in the vicinity of 850 nanometers. Typically, the absorption edge of a gallium arsenide etalon might vary from 820 to 860 nanometers. Typically, the wavelength of the probe beam might be 40 or 50 nanometers greater than the wavelength of the absorption edge of the nonlinear medium. Suitable lasers for use in block are widely available, from companies such as Spectra-Physics. Photo-multiplier tubes such as 6, 7 and 19 in FIG. 1 also are widely available.

Referring again to FIG. 1, interference filter 17 is used to make sure that only the probe beam 20 reaches the photo-multiplier tube 19. All other frequencies are reflected by interference filter 17, including the frequency of the input beams 8 and 9. Thus, photo-multiplier tube 19 only sees the transmitted (etalon 16) probe beam, designated by reference numeral 20-1. The portions of the input beams 8 and 9 ultimately transmitted by etalon 16 are designated by reference numerals 8-3 and 9-3 in FIG. 1, and are stopped by interference filter 17.

Figure 4:
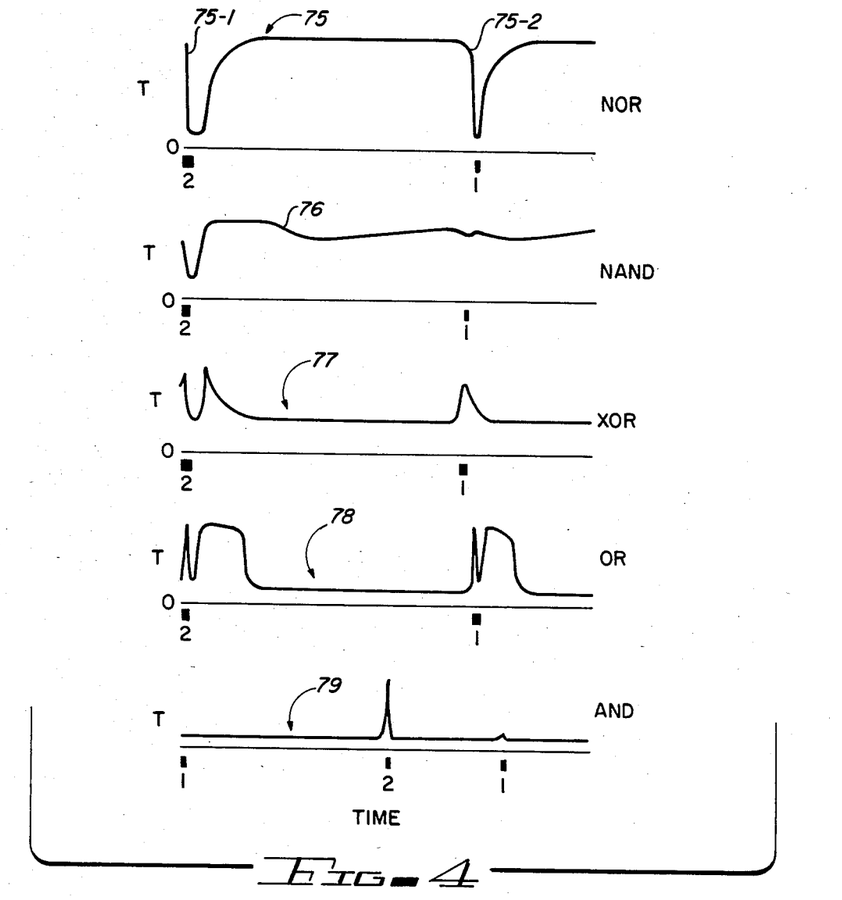
FIG. 4 is a graph showing experimental results obtained using dye filled etalons.

In the experimental set-up using dye etalons, the waveforms of FIG. 4 were traced from displays on an oscilloscope driven by the output of photo-multiplier tube 19. These waveforms will be described subsequently.

In FIG. 1, reference numeral 3 represents a flat rotating plate, or disc, driven about an axis 2 by an electrically controlled motor (not shown) in the direction of arrow 4. Small holes are provided in rotating disc 3 at points corresponding to points 3A and 3B to cause pulses of beams 8 and 9, respectively to be formed. The two beams 8 and 9 originate from block 21, which contains an argon laser and a beam splitter which aims the two "unpulsed" versions of beams 8 and 9 at the underside of rotating disc 3. The width of the holes 3A and 3B and the angular velocity of rotating disc determine the widths of the pulses of light of beams 8 and 9, respectively, that are transmitted to etalon 16. Note that reference numerals 8 and 9 are also used to designate these two beams after they have been pulsed by the action of rotating disc 3.

The wavelength of the laser in block 21 was selected because it was known to cause a shift in the transmissivity or index of refraction of the dye-filled etalon being used in the experiment.

Figure 2:
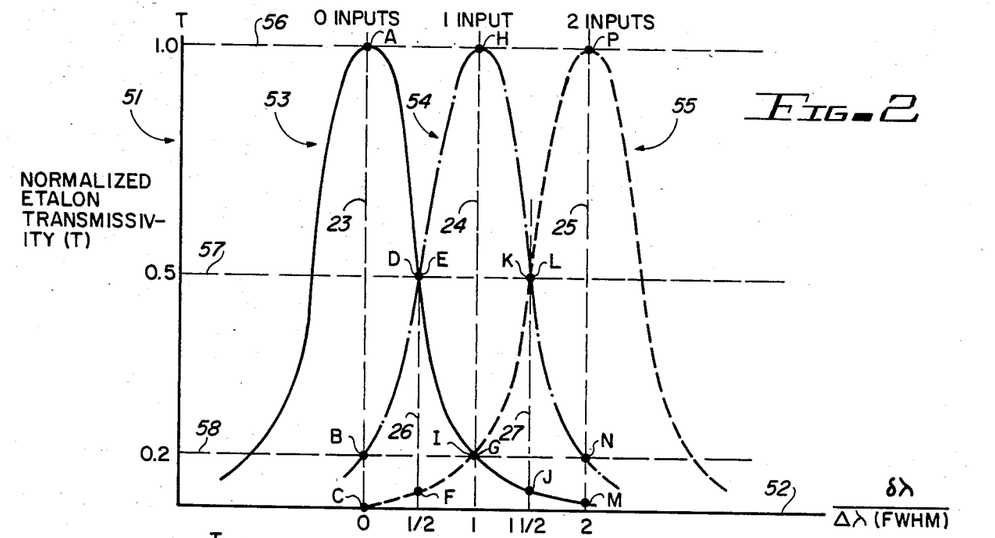
FIG. 2 is a graph illustrating the normalized transmissivity of the Fabry-Perot etalon in the diagram of FIG. 1 and is useful in explaining the logical operation thereof.

The operation of optical logic apparatus 1 will be explained with reference to FIG. 2. FIG. 2 is a graph in which the vertical axis 51 represents the normalized transmissivity T of etalon 16, i.e., the intensity of a light beam transmitted by etalon 16 divided by the intensity of the incident portion of that beam. The horizontal axis 52 represents $\delta\lambda/\Delta\lambda g$ the "detuning" of the wavelength of the probe beam 20, normalized with respect to the full width, half maximum (FWHM) of the transmissivity characteristic of etalon 16.

The three transmissivity peaks 53, 54 and 55 in FIG. 2 represent the transmissivity of etalon 16 to probe beam 20 when zero, one or two of input beams 8 and 9 are incident on etalon 16. More specifically, transmissivity peak 53 is the transmissivity characteristic of etalon 16 when there are no pulses of either input beam 8 or input beam 9 incident on etalon 16. Transmissivity peak 54 is the transmissivity characteristic of etalon 16 when a pulse from either one, but not both, of input beams 8 or 9 is incident on etalon 16. Transmissivity peak 55 is the transmissivity characteristic of etalon 16 when pulses of both of input beams 8 and 9 are incident on etalon 16. In FIG. 2, transmissivity peak 54 has the same shape as peak 53 and is one full width half maximum (FWHM) distance to the right of transmissivity peak 53. In other words, the incidence of one input pulse of either input beam 8 or input beam 9 on etalon 16 causes the transmissivity characteristic of etalon 16 to shift to the right by one FWHM. Similarly, simultaneous incidence of pulses of both input beam 8 and input beam 9 on etalon 16 shifts the transmissivity characteristic two FWHM widths to the right, to produce transmissivity curve 55.

The amount of shift caused by the incidence of an input pulse is dependent upon the energy of that pulse, assuming the pulse has a wavelength that is absorbed by the nonlinear medium of etalon 16. The one FWHM width shift is chosen as a matter of convenience, and is not critical to operation of etalon 16 as an optical logic gate, as will become apparent.

In order to understand how the transmissivity curves in FIG. 2 lead to operation of etalon 16 in the apparatus of FIG. 1 as a logic gate, it is helpful to understand how the truth table of Table 1 below is obtained.

TABLE 1

| | COLUMN NO. | | | | | |
|---|---|---|---|---|---|---|
| Row No. | 1 Detuning of Probe Pulse (FWHM Widths) | 2 No Input Pulses | 3 One Input Pulse | 4 Two Input Pulses | 5 Transmitted Beam | 6 Reflected Beam |
| 1 | 0 | (A) 1→"1" | (B) .2→"0" | (C) 0→"0" | NOR | OR |
| 2 | .5 | (D) .5→"1" | (E) .5→"1" | (F) .1→"0" | NAND | AND |
| 3 | 1 | (G) .2→"0" | (H) 1→"1" | (I) .2→"0" | XOR | $\overline{\text{XOR}}$ |
| 4 | 1.5 | (J) .1→"0" | (K) .5→"1" | (L) .5→"1" | OR | NOR |
| 5 | 2 | (M) 0→"0" | (N) .2→"0" | (P) 1→"1" | AND | NAND |

What Table 1 shows is the normalized transmissivity of etalon 16 for no input pulses incident, one input pulse incident, and two input pulses incident in Columns 2, 3 and 4, respectively, for five different probe beam wavelengths. As will become clear subsequently, the logic function performed by etalon 16 upon the data signals represented by the input beam pulses is different for different wavelengths of the probe beam 20. Column 1 in Table 1 indicates the relative wavelengths of the five different probe beams. Columns 5 and 6 indicate the logical function performed by etalon 16 on the transmitted probe beam and the reflected probe beam, respectively. Those skilled in the art will recognize that the logical function performed on the transmitted probe beam is the logical complement of that performed on the reflected probe beam.

In Columns 2, 3 and 4 in Table 1, the capital letters in parenthesis indicate points which are correspondingly labeled on the graph of FIG. 2 to make it easy to see how the data in Table 1 was obtained.

First, with respect to Row 1 in Table 1, assume that probe beam 20 has a wavelength equal, for example, to the resonant wavelength of etalon 16. Its "detuning" is said to be zero. If no input pulses are incident, no shift in the transmissivity of etalon 16 occurs. The intersection of vertical dotted line 23 with transmissivity curve 53 occurs at point A, indicating that the transmissivity is 1.0. If one input pulse is present, the transmissivity characteristic shifts by one FWHM width, as indicated by 54. The intersection of vertical dotted line 23 (corresponding to the same probe beam wavelength) with curve 54 occurs at point B, as indicated by horizontal dotted line 58, whereat the transmissivity is roughly 0.2. Next, if input pulses of both input beams 8 and 9 are incident on etalon 16, then its transmissivity is indicated by curve 55, and the intersection of vertical dotted line 23 with curve 55 is approximately 0, as indicated by point C.

Thus, it can be seen that if transmissivities from 0.5 to 1.0 represent logical "1"s, and transmissivities of 0.2 or less represent logical "0"s, then Row 1 of Table 1 defines the truth table of a logical NOR function for the transmitted beam, the intensity of which is proportional to the transmissivity T, or defines the truth table of a logical OR for the reflected beam, the intensity of which is inversely proportional to transmissivity T. In other words, the transmissivity of etalon 16, for a probe beam having a "detuning" of zero, is a logical "1" if no input pulses are present, and is a logical 37 0" if either one or two input pulses is present. This is the definition of a logical NOR gate, as can be seen from Table 2, which shows the normal truth table of the logical functions referred to in Table 1.

TABLE 2

| BEAM 8 | BEAM 9 | OR | NOR | AND | NAND | XOR |
|--------|--------|----|----|-----|------|-----|
| 0 | 0 | 0 | 1 | 0 | 1 | 0 |
| 0 | 1 | 1 | 0 | 0 | 1 | 1 |
| 1 | 0 | 1 | 0 | 0 | 1 | 1 |
| 1 | 1 | 1 | 0 | 1 | 0 | 0 |

In Table 2, beams 8 and 9 are assumed to be at a logical "0", if no pulse thereof is incident on etalon 16, and are assumed to be a logical "1" if a pulse thereof is incident on etalon 16 (by virtue of one of the holes 3A and 3B of rotating disc 3 being aligned with the laser source 21 so that the beam is not blocked by disc 3 and continues through lens 14 and is reflected by polarizing cube 15 onto the surface of etalon 16.

A procedure analogous to the foregoing procedure can be used to obtain the other values in Table 1 for different input probe beam wavelengths. The values in Row 2 are determined by determining the intersection of dotted line 26 with curves 53, 54 and 55. The values in Row 3 are obtained by determining the intersections of dotted line 24 with transmissivity curves 53, 54, and 55 etc. Row 2 corresponds to a probe beam pulse detuned to have a wavelength which is one-half of a FWHM width longer than is the case for Row 1 of Table 1 and it can be seen that in this case, the transmissivity of etalon 16 represents a logical "1" except when both input pulses are present. As can be seen from Table 2, this is the definition of a logical NAND gate.

One skilled in the art can readily verify that the other logical functions shown in Table 1 are correct for other probe means "detuned" by one, one and one-half, and two FWHM widths.

An important characteristic of the device described above with reference to FIGS. 1 and 2 is that it is "self-resetting". What this means is that, for example, when the logical operation of etalon 16 is such that the output beam produced in response to a particular configuration of input beam levels is a logical "1", i.e., the output beam has a high intensity, then if the logical levels associated with the input beams are modified so that the output of the etalon should be a logical "0", then the output beam produced by etalon 16 with automatically undergo a transition toward a logical "0" state, i.e., toward a relatively low intensity level. Stated differently, the transmissivity of etalon 16 automatically returns to its original configuration when the input beam pulses are absent. This is in contrast to the logic devices disclosed in the above-described Seaton article, in which the described element is bistable.

FIG. 3 shows a plurality of "waveforms" or curves illustrating computer simulated results obtained from the arrangement shown in FIG. 1. The computer simulated results make no reference to any particular type of nonlinear medium of etalon 16. It has been found that it is possible to saturate the nonlinear medium material and produce the above-described shifts or changes in transmissivity in less than two tenths of a picosecond. These changes in transmissivity of nonlinear optical medium materials therefore can be accomplished almost instantaneously.

In FIG. 3, curve 65 indicates the refractive index n of the nonlinear medium of etalon 16. Input energies computed to be enough to shift the transmissivity peak of the nonlinear medium by one FWHM width were obtained. The change in the refractive index is indicated by 65-1 in FIG. 3. The refractive index n then exponentially recovers to its initial value, as indicated by 65-2. Then, at the time indicated by "4" on the horizontal scale, it is assumed that there is one input pulse incident to the etalon 16. At the time indicated by "8" on the horizontal axis, there are two such input pulses incident to the etalon. Reference numeral 126 designates the presence of two input beam pulses incident on etalon 16, and numeral 65-3 designates the effect of two simultaneous input pulses incident on etalon 16 on the refractive index of the nonlinear medium. Numeral 65-4 designates the expotential recovery to the initial value of the refractive index n. The probe beam 20 is synchronized to be incident to the etalon 16 immediately after the occurrence of the input beams at times 4 and 8. These are the times during which the nonlinear medium material is most excited and the maximum change in refractive index or transmissivity has occurred, and during which the most effective logical function is performed on the input probe beam, because the refractive index has had practically no time to relax back to its original value.

The probe beam pulses typically would have much higher intensity than the input beams, since the probe beam pulses which are transmitted by the etalon frequently need to drive two or three subsequent etalons as inputs thereto. However, the intensity of the probe beam is not relevant to the operation of a particular etalon upon which the probe beam is incident.

A fundamental requirement for any computer is that the output of a logic gate be of sufficient strength to drive other logic gates. For an optical logic gate held in a particular state by a signal of a particular wavelength only, this poses certain problems. The transmissivity of that optical logic gate is limited, because there must be absorption of energy of the incident beam or beams to "drive the nonlinearity" of the nonlinear medium of that optical logic gate. Thus, it appears that a "single wavelength" optical logic gate would require that gain be somehow provided, or else that optical logic gate would have to undergo undesirable energy absorption to have any hope of adequately driving other optical logic gates. Optical switches having "gain" have been analyzed theoretically, and lasing in ultra-short etalons is not difficult to achieve. However, optical logic gates having gain ("active gain" which involves stimulated emission, such as that which occurs in a laser, rather than "signal gain" in which the increase of signal strength of the output signal occurs by any other means relative to the input signal) would be more complex and require more power than the optical logic gates described herein. Furthermore, "negative logic" is more straightforwardly obtained from an optical logic device in which the probe beam does not affect its own transmission through the optical logic element. Those skilled in the art know that "signal gain" is a requirement for cascadability in logic gates. Another requirement for cascadability of logic gates is that the output of one logic gate be of an appropriate nature to act as an input to another logic gate.

In accordance with the present invention, the above fundamental problems can be overcome in a passive optical logic gate if the probe beam character, e.g., wavelength, differs from that of the input beams such that the probe beams do not significantly modify the transmissivity of the etalon upon which they are incident and the input beams do signficantly modify the transmissivity of the etalon upon which they are incident and wherein the intensity of the probe beam is much greater than that of any of the input beams, regardless of their logic levels. Before tackling the problem of signal propagation through many optical logic gates, first consider the advantages of a two-wavelength optical logic gate. Efficiency of the input beam pulses can be maximized by tuning them for maximum absorption by the nonlinear medium of the etalons. Further in accordance with the present invention, the probe beam can be tuned for low absorption by the nonlinear medium, allowing high transmissivity and finesse thereof. The increased finesse means that only a very small change of refractive index produces the desired change in the amplitude of the output beam produced by the etalon. In the low absorption region of some nonlinearities, i.e., saturation of an absortion peak, the linear absorption falls off inversely as the square of the detuning of the beam from the resonance frequency of the absorption, while the change of the refractive index for a given degree of saturation decreases inversely to the detuning of the beam frequency from the resonant frequency of the absorption. For nearly 100% reflecting mirrors, wherein the saturable absorption coefficient is much greater than the background absorption coefficient and the product of the saturable absorption coefficient and the cavity length is much greater than the scattering coefficient from each mirror, the required input energy is approximately inversely proportional to the detuning of the beam from the resonant frequency of the etalon, and best performance should be obtained when the cavity length is less than the sum of the scattering coefficient and the background absorption coefficient. Lowering power requirements by increasing finesse should not help thermal stability, since the device is correspondingly more sensitive to temperature change. The probe beam can have many times the energy of an input, in accordance with the present invention, while still not significantly affecting the optical logic gate's operation, and thus, the transmitted probe beam should be able to drive many other similar optical logic gates. This results in a large signal gain which is "total gain", rather than the differential gain observed in prior bistable optical switches.

In FIG. 3, curve 66 shows the transmissivity T of etalon 16 to the probe beam 20 as a function of time when etalon 16 is configured by the probe beam wavelength to perform a logical NOR function on the input beams 8 and 9. Reference numeral 66-1 shows a sudden decrease in transmission as a result of the shift in transmissivity of the etalon 16 caused by a single input beam pulse. See curve 54 of FIG. 2. Reference numeral 66-2 shows the recovery of the probe beam back to its initial value. Reference numeral 66-3 shows the drop in transmissivity T due to the incidence of two input beam pulses. The exponential recovery of the transmissivity T, indicated by 66-4, to a normal value is somewhat longer than the exponential recovery indicated by 66-2. In every instance, in which it is necessary to determine the cycle time of an etalon logic gate, it is necessary to consider the longest such exponential recovery time, i.e., "relaxtion time".

The curves 67, 68, 69 and 70 of FIG. 3 are entirely analogous to curve 66, except that differently "detuned" probe beam wavelengths are used, resulting in different logic functions being performed on the input beams 8 and 9 by etalon 16.

The appearance of some of the curves in FIG. 3 can be somewhat confusing because in some instances, such as the NAND curve 67, the response appears to be quite similar for either one or two beam inputs. But it must be kept in mind that the only time that the nonlinear medium response is meaningful is during the probe beam times indicated by 125 and 127. Dotted lines 127 and 128 help align these times with the various curves shown in FIG. 3 For example, in the NAND curve 67, for one input beam incident, the transmission of the probe beam will be quite high, as indicated by the point A, while for two input beams incident, the transmission will be very low, as indicated by B. Similarly, in the exclusive OR curve 68, if either input, but not both, is present, the high transmissivity indicated by point 68-1 will occur, whereas if both inputs are present, the low transmissivity indicated by 68-2 will be present. However, if the probe beam time is delayed too much, the contrast between the two levels 68-1 and 68-2 will be rapidly degraded.

Most of the experimental curves, shown in FIG. 4, are obtained from a dye-filled etalon, correspond fairly well to the results obtained from the computer simulation for FIG. 3. In some of the experimental curves in FIG. 4, the order of "two-input case" and the "one-input case" has been reversed from the order shown in FIG. 3. Thus, the edge 75-1 of the NOR curve 75 in FIG. 4 corresponds to the edge 66-3 of curve 66 in FIG. 3, and edge 75-2 of curve 75 of FIG. 4 corresponds to edge 66-1 of curve 66 of FIG. 3. In FIG. 4, the darkened blocks directly beneath each horizontal axis have a digit "1" or "2" directly beneath them indicating whether one or two of the input beams 8 and 9 were incident on etalon 16.

The experimental NOR curve 75 showed excellent agreement with the computer simulated curve 66. The experimental NAND curve 76 showed fairly good correspondence to the transmissivity results indicated in computer-simulated curve 67 of FIG. 3 at "probe beam times" immediately after the occurence of the input beams. However, the recovery from the incidence of one input beam for curve 76 did not correspond closely to the recovery indicated in curve 67 of FIG. 3.

The experimental exclusive OR curve 77 in FIG. 4 shows some characteristics that I don't understand during the presence of the two incident pulses, but immediately afterwards, during the probe beam, the transmissivity of the experimental exclusive OR curve 77 (FIG. 4) are close to those of the corresponding simulated exclusive OR curve 68 of FIG. 3.

The experimental OR curve 78 of FIG. 4, however, does not correspond at all to the computed OR curve 69 of FIG. 3. At the present time, I have no explanation for these unexpected results. The experimental AND curve 79 in FIG. 4 agrees very closely to the computed AND curve shown in FIG. 3.

In reviewing Tables 1 and 2, it may be helpful to note that each entry in Column 3 of Table 1 actually corresponds to two of the four combinations (namely 0,1 and 1,0) of Table 2, since the entry in Column 3 corresponds to the transmissivity of etalon 16 produced in response to the presence of a pulse on either one of, but not both of input beams 8 and 9.

Hence, it can be seen that in accordance with the present invention, etalon 16 performs various common logic operations on the input beams. Although only two input beams have been shown, the results above can be extended to any number of input beams, as long as the incidence of each additional one of them produces a satisfactory corresponding shift in the transmissivity of the etalon.

It can be seen that the amount of shift caused by the presence of each additional input beam pulse incident on etalon 16 establishes "threshold" points which determine when the transmissivity represents a logical "0" or a logical "1" and thereby determine the logical function performed by etalon 16 upon the signals of the input beams 8 and 9. By way of example, for a NOR gate, it is desirable for one input beam pulse to shift the transmissivity characteristic to the right more than one FWHM width in order to obtain best "contrast" i.e., as long as the ratio of the transmissivity representing a logical "1" divided by the transmissivity representing a logical "0" is sufficiently high to avoid confusion.

For example, in the case of NOR gate, shifting transmissivity curve 54 more than one FWHM to the right in response to one input beam pulse would result in a transmissivity of less than 0.2 as the highest possible logical "0" which would be perhaps desirable.

Actually, transitions between a logical "1" and a logical "1" as high as the midway points corresponding to line 57 in FIG. 2 are not particularly desirable, although good logic circuit operation did result in the experiments.

Incidentally, those skilled in the art will recognize that the logic operation is performed by a modification of the etalon's transmissivity of reflectivity. This modification is accomplished by the input beams causing a change in the nonlinear medium's absorptivity and/or index of refraction.

Etalon 16 can also function as an optical logic element in a different manner than explained above. Before explaining this, it is noted that the mechanism of modifying the transmissivity of etalon 16 to the probe beam 20 (FIG. 1) as described above involves "lateral shifting" of the transmissivity characteristic of the etalon in response to energy received from the various input beams. This lateral shifting is caused by modification of the index of refraction of the nonlinear medium of the etalon. Note that the "amplitude" of the transmissivity characteristics in FIG. 2 does not change, however.

Figure 2A:
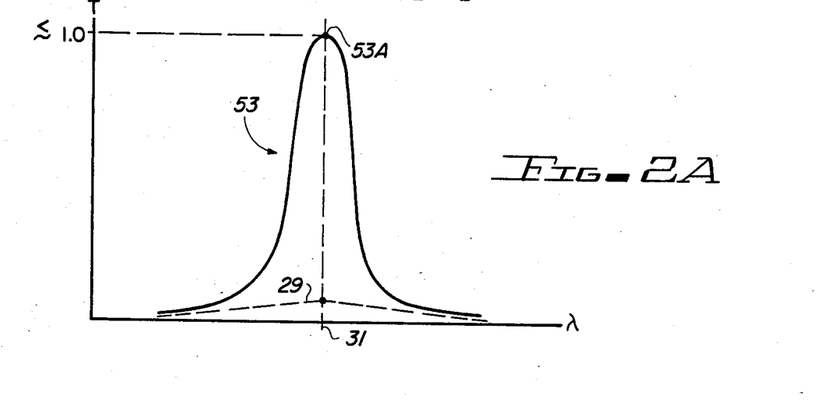
FIG. 2A is a graph analogous to FIG. 2 and is useful in explaining an alternate embodiment of the invention based purely on saturation of absorption in an etalon.

In contrast, in FIG. 2A, the mechanism for modifying the transmissivity of etalon 16 to probe beam 20 is different because the amplitude of the transmissivity characteristic 53 in FIG. 2A does vary in such a way as to make it possible to perform common logical functions on a plurality of input beams incident on the etalon. This change in the amplitude of the transmissivity characteristic 53 in FIG. 2A is caused by modification of the coefficient of absorption of the nonlinear medium by the incident input beams. In this case, there is no change in the index of refraction of etalon 16 in response to incidence of an input beam. Therefore, the transmissivity peak does not shift laterally. In FIG. 2A, the dotted line 29 represents the transmissivity of etalon 16 with no input beams incident thereon. Typically, applying one input beam to etalon 16 will not significantly increase the amplitude of the dotted line curve 29. However, if enough input beams are made incident to etalon 16, the transmissivity of etalon 16 at the probe beam wavelength will increase to point 53A at the probe beam wavelength designated by reference numeral 31. For this condition of many input beams incident on the etalon, the probe will be transmitted by the etalon. This condition complies with the definition of a logical AND gate. I.e., this operation occurs only if there are enough input beams incident with sufficient energy to saturate the absorption property of the nonlinear medium of the etalon. However, if the input beams have sufficient energy or intensity that any one of them alone is enough to saturate the absorption property of the etalon, then the operation on the probe beam will be that of a logical OR gate.

The foregoing modes of operation of the etalon result in noninverting logic functions, in transmission of the probe beam and inverting logic functions in reflection of the probe beam whereas the technique of shifting the transmissivity characteristics of an etalon in response to presence of input beams incident on the etalon to produce a transition from a logical "1" to a logical "0" can produce inverting logic functions, such as the NOR, and NAND functions in transmission of the probe beam.

Generally, this is an advantage, because generally, inverting and logic functions are more desirable to logical system designers. Although inverting logic can be obtained by detecting the reflected, rather than the transmitted component of the probe beam, generally, the "contrast" of the reflected beam is lower. This can present a serious problem in reliably detecting optical beams that represent the results of logical operations on signals represented by input beams, especially when the reflected probe beams are then utilized as inputs to a successive etalon also being used as a logic element. The combination of two or more such low contrast reflected probe beams is likely to result in erroneous or low reliability logical operation by a subsequent etalon that functions as a logic element.

Figure 1A:
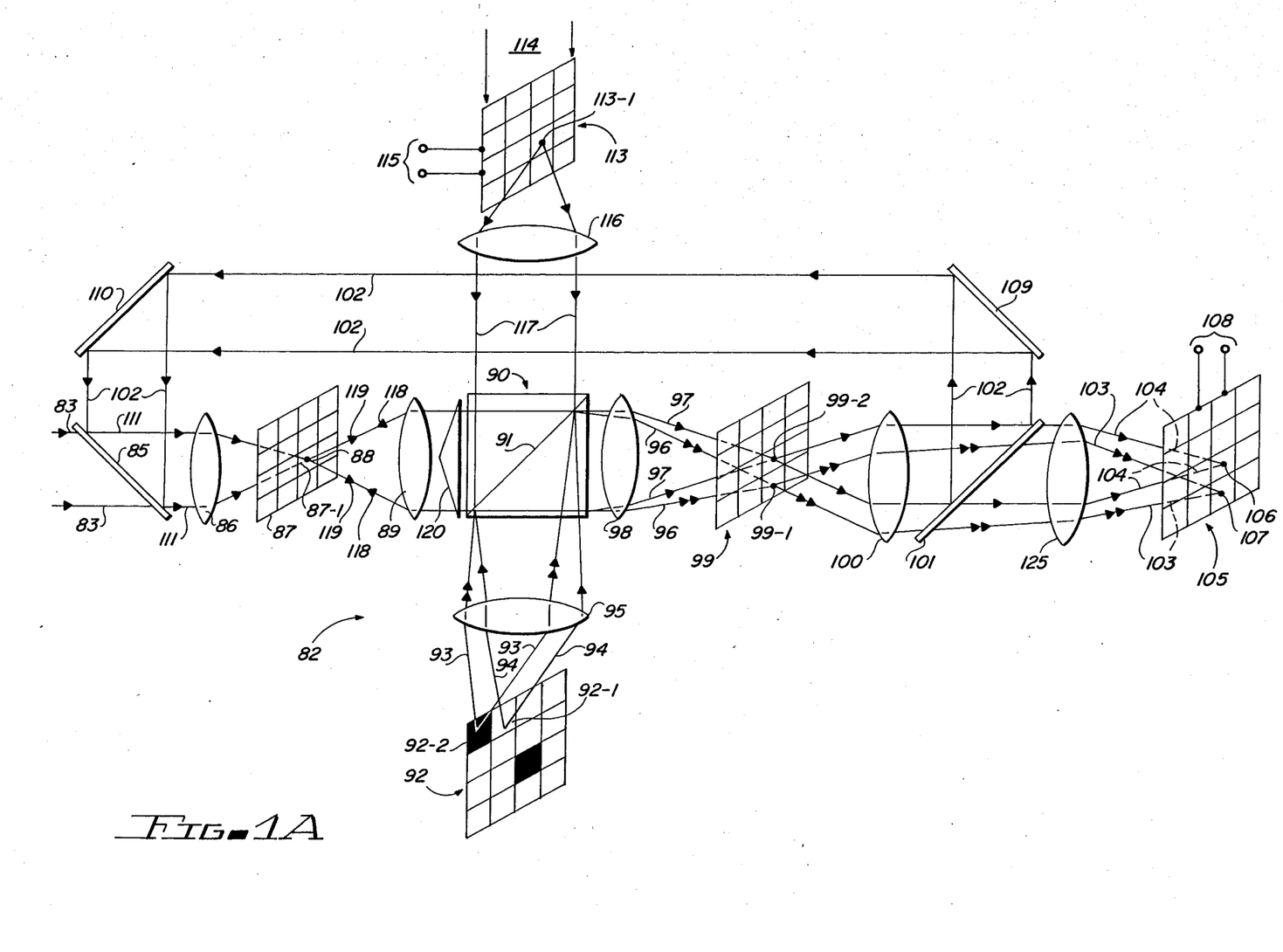
FIG. 1A is a schematic diagram illustrating multiple levels of logic in accordance with the present invention.

Referring to FIG. 1A, a logic "system" is disclosed using a number of arrays of the nonlinear Fabry-Perot etalons functioning as logic elements in the manner described above. Ordinarily, nonlinear media such as gallium arsenide having extremely fast relaxation times would be utilized in a practical optical logic system. In FIG. 1A, optical logic system 82 includes a probe beam 83 which is focused by a lens 86 onto a particular etalon 87-1 of an array 87 of identical etalons. The input for the system can be provided by means of a spatial light modulator 113, which can be a liquid crystal array, a CCD (charge coupled device) element. A light beam 114 illuminates the spatial light modulator 113. Modulation in the form of electrical signals applied to terminals 115 is accomplished. Another input to optical logic system 82 is provided in the form of feedback of light beams 102 from an output circuit, subsequently described, fed back by means of mirrors 109, 110, and beam splitter 85 to provide the composite input beams indicated by reference numeral 111 which are focused by lens 86 onto a particular etalon element, such as 87-1 in array 87. The Throughput of or transmission of beams 111 by etalon 87-1 is collected by lens 89 and is collimated so that it goes through the beam splitter 90 and then is focused by lens 98 onto logic element (etalon) 99-2 of array 99. Reference numeral 97 indicates the subject beam after it passes through lens 98.

In a system of two-wavelength optical logic gates, the optical logic gates cannot be identical, of course because the output from the first optical logic gate could not function as an input for another identical optical logic gate. What is possible, in accordance with the present invention, is a system using two similar nonlinear media or materials in two different successive optical logic gates, where the probe beam wavelength for the first optical logic gate is on the absorption peak for the nonlinear media of the second optical logic gate to which the output of the first optical logic gate is applied as an input. The nonlinear medium of the first optical logic gate should also have high absorption at the wavelength of the probe beam being supplied to the second optical logic gate. Thus, the wavelengths of input beams and probe beams are reversed for alternate cascaded optical logic gates, and propagation through an even number of such optical logic gates produces an output beam having the same wavelength as the input beams applied to the odd numbered optical logic gates in the group. Furthermore, operation in a closed loop manner (as seen in FIG. 1A) also is possible using any two optical logic gates (or two arrays of optical logic gates) and two wavelengths. An isolated saturable line absorption feature which is shifted in one material relative to the other should provide the desired characteristics. In semiconductors such as GaAs or CdS, the absorption might be an exiton feature well resolved from the band edge. In gallium arsenide, the peak can be shifted by adding a small amount of aluminum bulk material or by varying the well thickness in a multiple quantum well structure.

The output of array 87 thereby becomes an input to array 99.

Two probe beams designated by reference numerals 93 and 94, respectively, are produced in response to a device which can be a spatial light modulator similar to 113. The two probe beams 93 and 94 are reflected from beam splitter 91 through lens 98 onto etalons 99-1 and 99-2 of array 99.

By placing a prism face such as 120 on cube 90, the beam emanating from section 113-1 of spacial light modulator 113 can be focused as an input not only to etalon 87-1 of array 87, as indicated by arrows 118, but also on other adjacent etalons of array 87, although the resulting beams for convenience are not shown. Probe beams 93 and 94 emanate from elements 92-2 and 92-1 of array 92. These two probe beams, along with the outputs of array 87, (which will become inputs to array 99) are focused onto etalons 99-1 and 99-2. The transmitted beams are collected by lens 100, which are followed by a beam splitter 101. Beam splitter 101 takes part of the output signal from array 99 to produce feedback beam 102 which, as explained above, may be fed back and utilized as an input to one or more etalons elsewhere in a typical system. Some of the output beam signals from array 99 also are directly transmitted by beam splitter 101 to another lens 125 which focuses the output beams or maps them onto appropriate light detecting elements of a detector array 105, which in turn, produces electrical output signals on terminals, such as 108, thereby producing thereon electrical signals representing the logical output of optical logic system 82 in electrical form. More specifically, the output beams produced by the etalons 99-1 and 99-2 of array 99 are mapped onto elements 106 and 107, respectively, of detector array 105, which might, for example, be a CCD device.

The alignment of the various arrays, lens, beam splitters, lenses and mirrors can be easily accomplished at the present state of the art and presents no problem to one skilled in the art.

No difficult technological problems are presented by the basic system arrangement shown in FIG. 1A.

Figure 6:
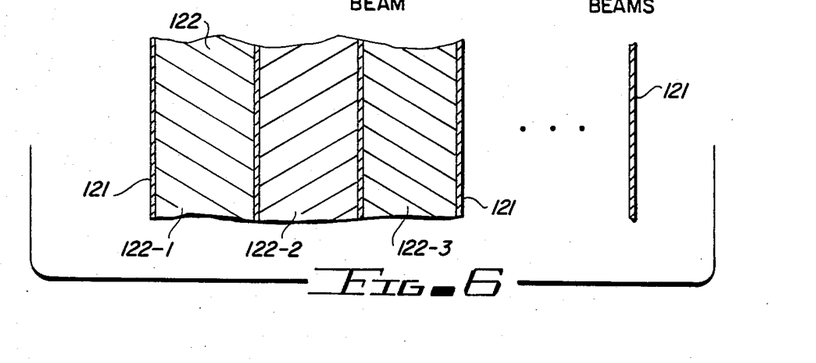
FIG. 6 is a diagram of a multiple cavity having N+1 mirrors and up to N regions containing a nonlinear medium which can be used instead of nonlinear Fabry-Perot etalons.

The diagram in FIG. 6 illustrates the fact that there can be many cavities on a single device, rather than a single cavity as shown in the previously mentioned Fabry-Perot etalons. There can be n+1 reflecting surfaces such as 121. These bound n regions such as 122-1, 122-3, etc., may or may not contain a nonlinear medium. This kind of device can have similar transmissivity characteristics to a Fabry-Perot etalon in that one can make the medium material layers having optical thicknesses that are integral multiples of quarter wavelengths of the probe beam. As an example in which four reflecting surfaces are used, the coating characteristics can be optimized by providing a linear medium between the first and second reflecting surfaces and the third and fourth reflecting surfaces and providing a nonlinear medium between the second and third reflecting surfaces. This type of device would in essence be a nonlinear Fabry-Perot etalon. With proper design, such a device could be made to be highly transmitting to the input beams at the input beam wavelengths so that maximum efficiency of the input pulses would be obtained and yet the resulting etalon would be highly reflecting at the probe beam wavelength. This type of device would have the finesse that would be desired. As those skilled in the art know, finesse is defined as free spectral range divided by the FWHM width of the transmission peak in frequency where the free spectral range is the frequency difference between two adjacent transmission peaks, or the speed of light divided by twice the optical thickness of the etalon.

If all of the regions between the reflecting surfaces of the device shown in FIG. 6 are filled with a nonlinear medium, my computer calculations have shown that the operation is similar to that of a nonlinear Fabry-Perot etalon.

A special case of the NOR gate logic function of etalon 16 occurs if there is only one input beam utilized, in which case etalon 16 functions as an inverter.

When there are more than two input beams present, other functions are possible. For example, suppose there are a number of inputs greater than two, each of which has an energy or intensity level which causes it to shift the transmissivity characteristic of FIG. 2 to the right by one FWHM width. Then, if the probe beam is detuned by N FWHM widths, (N being an integer) then etalon 16 functions as a number selector which will produce a high beam output level if there are exactly N input pulses impinging on etalon 16. However, if there is any other number of input beams impinging on etalon 16, it will produce a low beam output level.

If the input beam pulses produce shifts of the transmissivity peak of the nonlinear medium by less than a FWHM width, then etalon 16 can function as a "range selector" wherein it produces a high output beam level when the number of input beams is in a certain range and the width of that range is approximately 1 divided by the number of full FWHM widths that each input beam shifts the peak.

Figure 5:
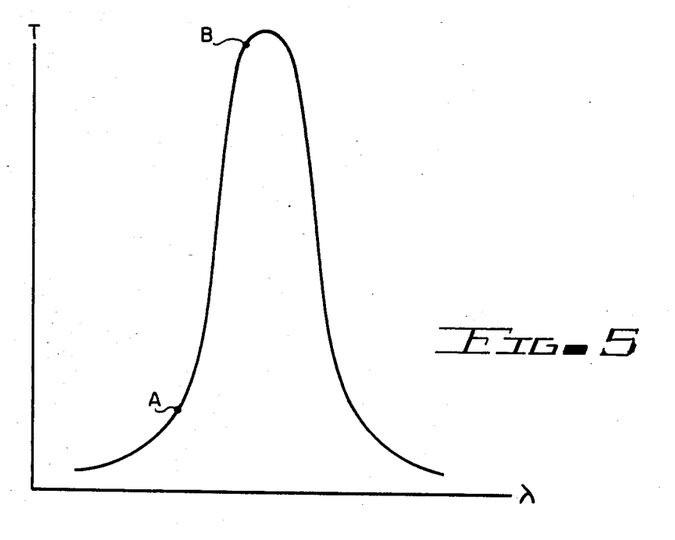
FIG. 5 is a graph showing the approximately linear portion of the transmissivity peak in a Fabry-Perot etalon.

If a continuous wave probe beam of relatively high intensity (i.e., much higher than the input beam intensity) is directed to etalon 16, and has a wavelength equal to the wavelength at point A of FIG. 5 near the base of the approximately linear portion of the transmissivity peak of etalon 16, as shown, and if there is only one input beam, such as input beam 8 in FIG. 1, which is modulated at a rate that is slow compared to the relaxation time of the nonlinear medium of etalon 16, then the transmissivity curve shown in FIG. 5 will shift in accordance with the slow modulation of that input beam. This will cause the transmissivity of the etalon to vary along the approximately linear portion of the transmissivity curve shown in FIG. 5. To avoid distortion, the maximum modulation amplitude of the input beams should be such that point B of the transmissivity curve of FIG. 5 is at the wavelength of the probe beam, so as to avoid the highly nonlinear peak portion of the transmissivity curve.

While the above-described shifting of the transmissivity curve of FIG. 5 in response to the slow modulation of the single input beam can be accomplished with only that input beam to provide a high degree of amplification of the modulation signal, an entirely similar shifting of the transmissivity peak of FIG. 5 can be obtained in response to many lower amplitude input beams instead of only on. They will achieve a form of digital-to-analog conversion, if all of the input beams have the same intensity. However, if the multiple input beams have different intensities, the etalon will function as a signal summing device.

If both input beams and the probe beam are pulses of durations that are short compared to the relaxation time of the nonlinear medium, it is not necessary that the input beams and the probe beam be simultaneously incident on the etalon. If the nonlinear medium is such that absorption of one input pulse changes the refractive index of the nonlinear medium at the probe wavelength enough to shift the Fabry-Perot transmission peak by about 1 FWHM, the peak will, of course, return to its original wavelength within a few relaxation time constants. Thus, if the probe beam pulses is incident on the etalon within a time short compared to the relaxation time constant after the input beams have terminated, only this instantaneous transmission (of the probe beam through the etalon) determines the output.

While the invention has been described with reference to several particular embodiments thereof, those skilled in the art will be able to make various modifications thereto without departing from the true spirit and scope of the invention. It is intended that methods and apparatus which perform substantially the same function in substantially the same way to achieve substantially the same result be encompassed by the invention.

For example, the techniques described with reference to FIGS. 2 and 2A can be combined in a single device in which the transmissivity curve is both laterally shifted and its amplitude is simultaneously modified in response to the input beams. The multiple cavity etalon devices shown in FIG. 6 are intended to be encompassed by the word "etalon", in addition to the single cavity devices such as etalon 16 shown in FIG. 1.

I claim:

1. A method of operating an optical logic apparatus including a first etalon optical switching device having a nonlinear medium, said method comprising the steps of:
   (a) producing a first input beam having a first wavelength and representing a relatively high intensity that represents a first logical state of a first logic signal and guiding said first input beam along an axis that is perpendicular to a surface of said first optical switching device;
   (b) producing a second input beam having said first wavelength and representing a relatively high intensity that represents said first logical state of a second logic signal and guiding said second input beam to said first optical switching device;
   (c) producing a first probe beam having a second wavelength and guiding said first probe beam to said first optical switching device while the nonlinear medium is under the influence of said first and second input beams,
   wherein the intensity of said first probe beam is much greater than any intensities of said first and second input beams, and wherein said second wavelength is such that said first probe beam does not significantly modify the transmissivity of said nonlinear medium and said first wavelength is such that said first and second input beams do significantly modify the transmissivity of said nonlinear medium;
   (d) causing said first optical switching device to produce a first output beam in response to steps (a) through (c), which first output beam has said second wavelength and contains an output signal that is a predetermined logical function of said first and second logic signals, said first output beam having a first intensity level;
   (e) changing said first and second input beams to a configuration wherein at least one of said first and second input beams is at a relatively low intensity representing a second logic level of the first or second logic signal represented by that input beam;
   (f) in response to step (e), causing said first output beam to undergo a transistion from said first intensity level to a second intensity level that represents a logic state opposite to one represented by said first intensity level; and
   (g) guiding said first output beam to a second optical switching device having a nonlinear medium, and producing a second probe beam having said first wavelength and guiding said second probe beam to said second optical switching device, said nonlinear medium of said second optical switching device being such that changing of the intensity of light in said first output beam causes a predetermined change in the transmissivity of said second optical switching device at said first wavelength, causing said second optical switching device to produce a second output beam which has said first wavelength and is a predetermined logical function of said first output beam.

2. The method of claim 1 wherein step (a) includes producing pulses in said first probe beam.

3. The method of claim 1 wherein step (b) includes producing pulses in said first input beam, the pulses in said first input beam being spaced further apart in time than the relaxation time of the transmissivity of said first optical switching device.

4. The method of claim 1 wherein said predetermined change in the transmissivity of said first optical switching device is primarily a lateral shift in the transmissivity of said first optical switching device with respect to the wavelength of light of said first probe beam transmitted therethrough.

5. The method of claim 1 wherein said predetermined change in the transmissivity of said first optical switching device is primarily a change in the amplitude of the transmissivity curve of said first optical switching device to said first probe beam.

6. The method of claim 4 including changing the wavelength of said first probe beam to change the predetermined logic function performed by said first optical switching device on said first and second logic signals.

7. The method of claim 1 including the stop of producing at least one additional input beam representing an additional logical signal and guiding said additional input beam to said first optical switching device optical switching device to cause said first etalon to perform said predetermined logical function of said first and second and said additional input beams.

8. The method of claim 1 wherein said first optical switching device includes a first elaton and said second optical switching device includes a second etalon, the method including producing at least one other additional input beam having said first frequency and guiding it to said second etalon, causing said second etalon to produce said second output beam as a predetermined logical function of said first output beam and that additional other input beam.

9. The method of claim 8 wherein said first etalon is part of a first array of etalons and/or said second etalon is part of a second array of etalons, said method including optically mapping a plurality of input beams and probe beams having said first frequency into various etalons of said first array to produce a plurality of output beams of said first frequency emanating from said first array and optically mapping those output beams and a plurality of probe beams of a second frequency into various etalons of said second array of etalons to produce a plurality of additional output beams of said second frequency.

10. The method of claim 9 including optically mapping said output beams from said second array into a photodetecting means to produce electrical signals corresponding to those output beams.

11. The method of claim 10 including optically mapping output beams from a spatial light modulating means into said first array and/or said second array.

12. The method of claim 1 including providing surfaces of said first optical switching device, which surfaces are highly reflective of said first probe beam while being relatively transmissive to said first and second input beams, to thereby increase the signal gain of said first output beam relative to said first and second input beams.

* * * * *